(12) United States Patent
Seo et al.

(10) Patent No.: US 10,971,770 B2
(45) Date of Patent: Apr. 6, 2021

(54) BATTERY PACK HAVING CRASH BEAM STRUCTURE

(71) Applicant: LG CHEM, LTD., Seoul (KR)

(72) Inventors: Sung-Won Seo, Daejeon (KR); Jeong-O Mun, Daejeon (KR); Yoon-Koo Lee, Daejeon (KR); Ho-June Chi, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 99 days.

(21) Appl. No.: 16/349,398

(22) PCT Filed: Feb. 19, 2018

(86) PCT No.: PCT/KR2018/002009
§ 371 (c)(1),
(2) Date: May 13, 2019

(87) PCT Pub. No.: WO2018/186582
PCT Pub. Date: Oct. 11, 2018

(65) Prior Publication Data
US 2019/0267682 A1 Aug. 29, 2019

(30) Foreign Application Priority Data

Apr. 4, 2017 (KR) .................. 10-2017-0043911

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/653* (2015.04);
(Continued)

(58) Field of Classification Search
None
See application file for complete search history.

(56) References Cited

U.S. PATENT DOCUMENTS 7,541,770 B2    6/2009   Kim et al.
7,605,562 B2   10/2009   Kim
(Continued)

FOREIGN PATENT DOCUMENTS

JP    2009-54403 A    3/2009
JP    2009-176464 A   8/2009
(Continued)

OTHER PUBLICATIONS

International Search Report issued in PCT/KR2018/002009 (PCT/ISA/210), dated Jun. 5, 2018.

*Primary Examiner* — Daniel S Gatewood
(74) *Attorney, Agent, or Firm* — Birch, Stewart, Kolasch & Birch, LLP

(57) ABSTRACT

A battery pack including a plurality of battery modules; a tray including an interior space where the plurality of battery modules are positioned; a plurality of I-type beam frames traversing an upper surface of the tray to partition spaces where the plurality of battery modules are positioned; and a plurality of heatsinks disposed between the battery modules and the I-type beam frames and mounted to recessed portions formed at both side of a column that forms a height of the I-type beam frames to absorb heat from the battery modules.

17 Claims, 5 Drawing Sheets

(51) Int. Cl.
*H01M 10/6551* (2014.01)
*H01M 10/6556* (2014.01)
*H01M 10/653* (2014.01)
*H01M 50/20* (2021.01)

(52) U.S. Cl.
CPC ... *H01M 10/6551* (2015.04); *H01M 10/6556* (2015.04); *H01M 50/20* (2021.01)

(56) References Cited

U.S. PATENT DOCUMENTS

| | | | |
|---|---|---|---|
| 8,293,397 B2 * | 10/2012 | Uchida | H01M 2/1077 429/120 |
| 10,020,549 B2 | 7/2018 | Lee et al. | |
| 2012/0224326 A1 | 9/2012 | Kohlberger et al. | |
| 2015/0244036 A1 | 8/2015 | Lane et al. | |
| 2015/0263397 A1 | 9/2015 | Janarthanam et al. | |
| 2017/0012330 A1 | 1/2017 | Kim et al. | |
| 2018/0375180 A1 | 12/2018 | Buck et al. | |

FOREIGN PATENT DOCUMENTS

| | | | | |
|---|---|---|---|---|
| JP | 2010-92598 A | 4/2010 | | |
| JP | 4494719 B2 | 6/2010 | | |
| JP | 2011-198688 A | 10/2011 | | |
| JP | 2011-204382 A | 10/2011 | | |
| KR | 10-0612305 B1 | 8/2006 | | |
| KR | 0612305 B1 * | 8/2006 | ......... | H01M 2/1077 |
| KR | 10-2006-0108820 A | 10/2006 | | |
| KR | 10-2008-0016044 A | 2/2008 | | |
| KR | 10-2010-0100859 A | 9/2010 | | |
| KR | 10-2013-0086678 A | 8/2013 | | |
| KR | 10-2015-0099965 A | 9/2015 | | |
| KR | 20150099965 A * | 9/2015 | ......... | H01M 10/625 |

\* cited by examiner

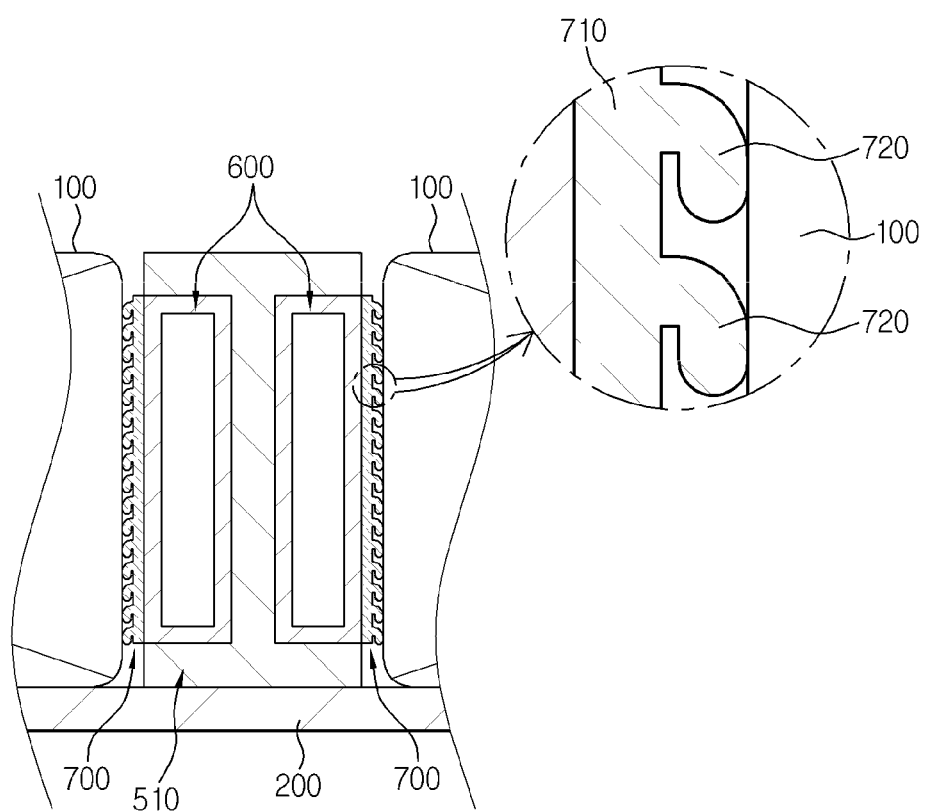

BATTERY PACK HAVING CRASH BEAM STRUCTURE

TECHNICAL FIELD

The present disclosure relates to a battery pack, and more particularly, to a battery pack having a space-efficient loading structure for battery modules.

The present application claims priority to Korean Patent Application No. 10-2017-0043911 filed on Apr. 4, 2017 in the Republic of Korea, the disclosures of which are incorporated herein by reference.

BACKGROUND ART

Unlike a primary battery which is not rechargeable, a secondary battery refers to a battery capable of charging and discharging and is used as a power source for an energy storage system (ESS), an electric vehicle (EV) or a hybrid electric vehicle (HEV) as well as small advanced electronic devices such as a mobile phone, a PDA and a notebook computer.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

For example, when a plurality of battery cells are connected in series or in parallel to configure a battery pack, it is common to configure a battery module composed of a plurality of battery cells first, and then configure a battery pack by using a plurality of battery modules and adding other components. In other words, the battery module refers to a component where a plurality of secondary batteries are connected in series or in parallel, and the battery pack refers a component where a plurality of battery modules are connected in series or in parallel to increase capacity and output.

Meanwhile, in a battery pack of a multi battery module structure, it is important to easily discharge heat generated from each battery module. If the heat of the battery module generated during charging and discharging is not effectively removed, heat accumulation may occur, resulting in deterioration of the battery module and causing ignition or explosion. Thus, a high-output large-capacity battery pack essentially requires a cooling device for cooling the battery modules included therein.

In addition, in the case of an electric vehicle, unexpected shocks and vibrations may be applied to the battery pack during operation. In this case, the electrical connection between the battery modules may be broken, or the pack case supporting the battery modules may be deformed. Thus, in particular, the battery pack for an electric vehicle is required to have sufficient durability against external shocks and vibrations. To solve this problem, a crash beam is often used to increase the mechanical stiffness of the battery pack. Here, the crash beam may refer to a beam-like structure that is installed at a tray constituting the battery pack case. The tray including the crash beam has a high impact resistance and is not easily deformed by external shocks or vibrations.

However, even though the mechanical rigidity of the battery pack is improved by installing the crash beam, in this case, the space available for loading battery modules is reduced as much. Further, if the essential cooling device configuration such as a heatsink is further added, the volume ratio or the energy density of the battery pack including the heatsink is lowered. As described above, even though it is not easy to enhance the mechanical stiffness and the energy density of the battery pack at the same time, in the battery-related industries, the demand on a battery pack capable of satisfying all of structural safety, cooling performance and high energy density is recently increasing more and more.

DISCLOSURE

Technical Problem

The present disclosure is designed to solve the problems of the related art, and therefore the present disclosure is directed to providing a battery pack, which may improve the energy density while ensuring structural safety and cooling performance of battery modules.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a plurality of battery modules; a tray including an interior space where the plurality of battery modules are positioned; a plurality of I-type beam frames traversing an upper surface of the tray to partition spaces where the plurality of battery modules are positioned; and a plurality of heatsinks disposed between the battery modules and the I-type beam frames and mounted to recessed portions formed at both side of a column that forms a height of the I-type beam frames to absorb heat from the battery modules.

The plurality of heatsinks may be manufactured to have a shape corresponding to the recessed portions and are adhered to the recessed portions by a thermal conductive adhesive integrated with the respective I-type beam frame.

The height of each I-type beam frame may be equal to or greater than a height of the respective battery module.

The battery pack may further comprise a heat conduction medium interposed at a thermal interface between each heatsink and the respective battery module.

Each heat conduction medium may have a plate surface attached to one surface of the heatsink and a protrusion vertically protruding from the plate surface, and the protrusion may be configured to elastically deform when an external pressure is applied to the protrusion.

Each heat conduction medium may be made of a silicon rubber.

The battery pack may further comprise a center frame extending in one direction, crossing the plurality of I-type beam frames and traversing a center of the tray, and wherein the plurality of battery modules are arranged in a 2×N matrix.

Each of the heatsinks may have a hollow structure with an input port and an output port respectively provided at one end and an other end thereof so that a coolant flows in or out therethrough, and may traverse the upper surface of the tray along the respective I—type beam frame through the center frame.

The battery pack may further comprise a pack cover covering an upper surface of the tray and two side frames covering both side surfaces of the tray, respectively, and the two side frames may be provided in the form of a manifold tube communicating with the input ports and the output ports of the heatsinks to form a path for supplying and discharging the coolant.

The center frame may have an angled tube form with a plurality of holes formed at an outer side surface thereof so that module electrode terminals of the plurality of battery modules are inserted therein, and a connecting module may be provided in the center frame to connect the plurality of battery modules in series or in parallel, or both in series and in parallel.

In another aspect of the present disclosure, there is also provided an electric vehicle, comprising the battery pack defined above. The vehicle may include an electric vehicle (EV) and a hybrid electric vehicle (HEV).

Advantageous Effects

According to an embodiment of the present disclosure, the stiffness and volume ratio of the battery pack may be increased by engaging the I-type crash beam and the heatsink, and the cooling configuration for the individual battery modules may be compactly implemented.

In addition, according to another embodiment of the present disclosure, the contacting force of individual battery modules to the heatsink may be enhanced by using a protrusion-like heat conduction medium allowing elastic deformation. Accordingly, the cooling efficiency is improved, and the individual battery modules may be stably supported against external impacts or shaking.

DESCRIPTION OF DRAWINGS

FIGS. 7 and 8 are diagrams showing states of the battery pack according to another embodiment of the present disclosure before and after the heat conduction medium makes contact with the battery modules.

BEST MODE

Figure 1:
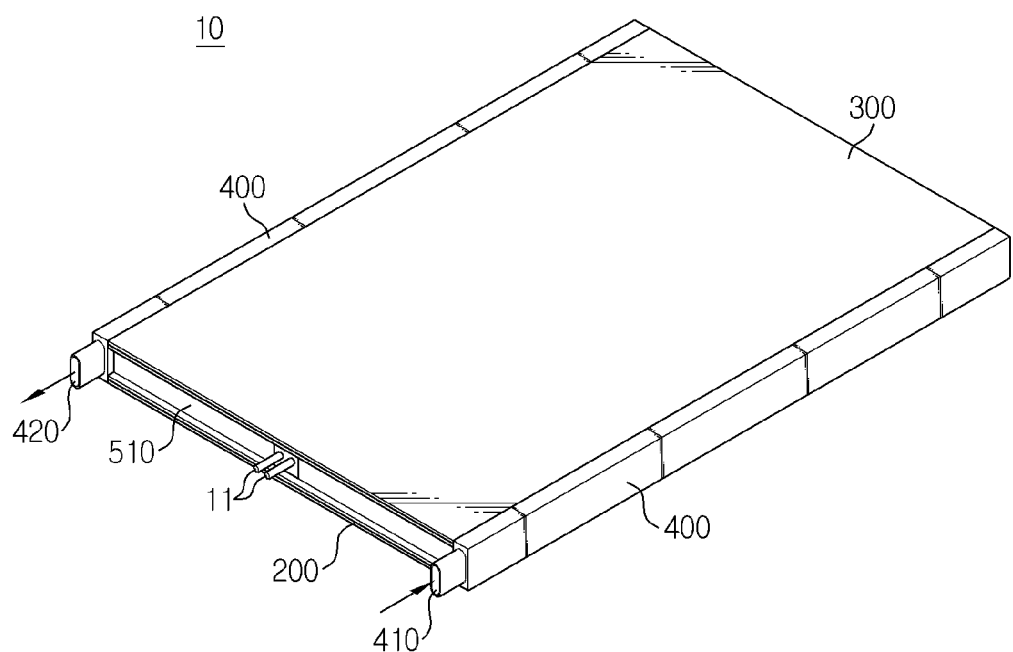
FIG. 1 is a schematic perspective view showing a battery pack according to an embodiment of the present disclosure.

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

That is, the embodiments described in the specification and depicted shown in the drawings are only the most preferred embodiments of the present disclosure and do not represent all the technical ideas of the present disclosure, and thus it should be understood that there may be various equivalents and variations capable of replacing the embodiments at the time of this application.

Figure 2:
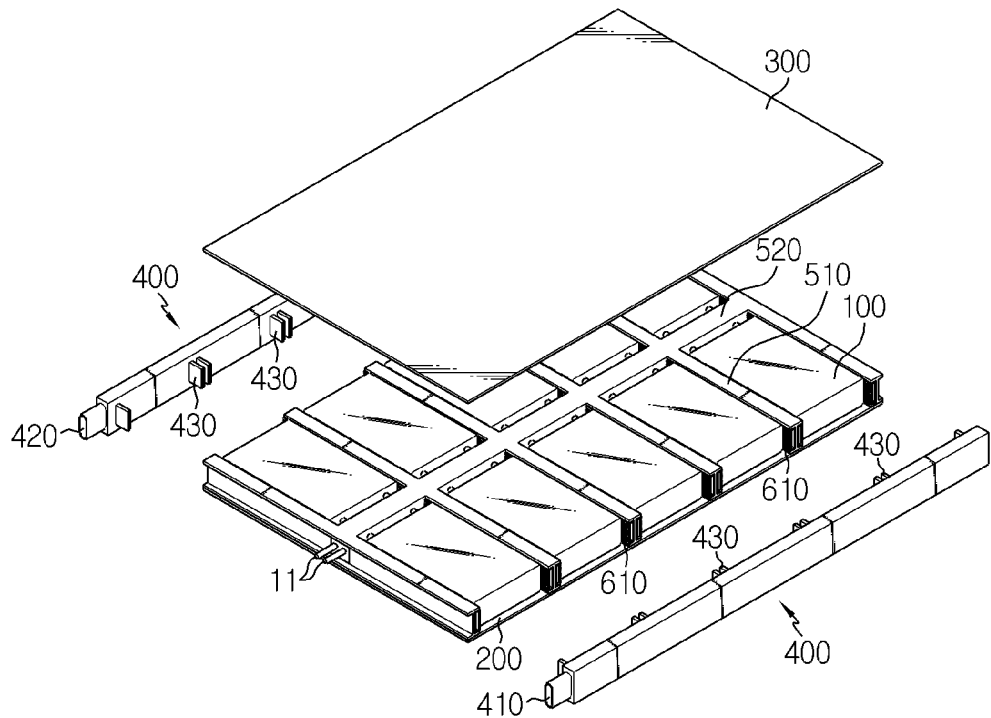
FIG. 2 is an exploded perspective view of FIG. 1.
Figure 3:
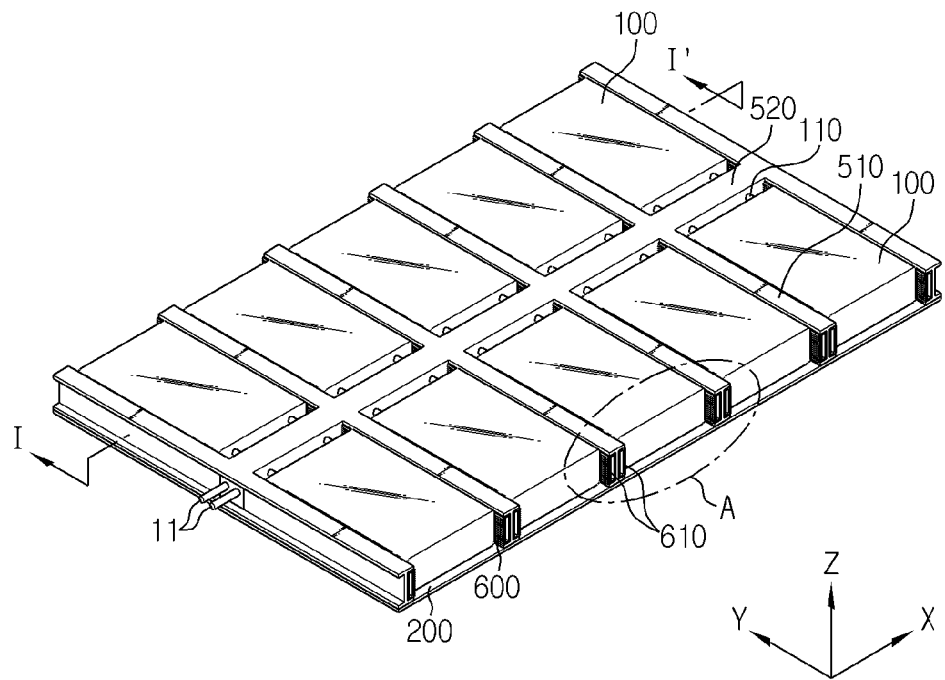
FIG. 3 is a perspective view showing a tray at which a plurality of battery modules of FIG. 2 are loaded.
Figure 4:
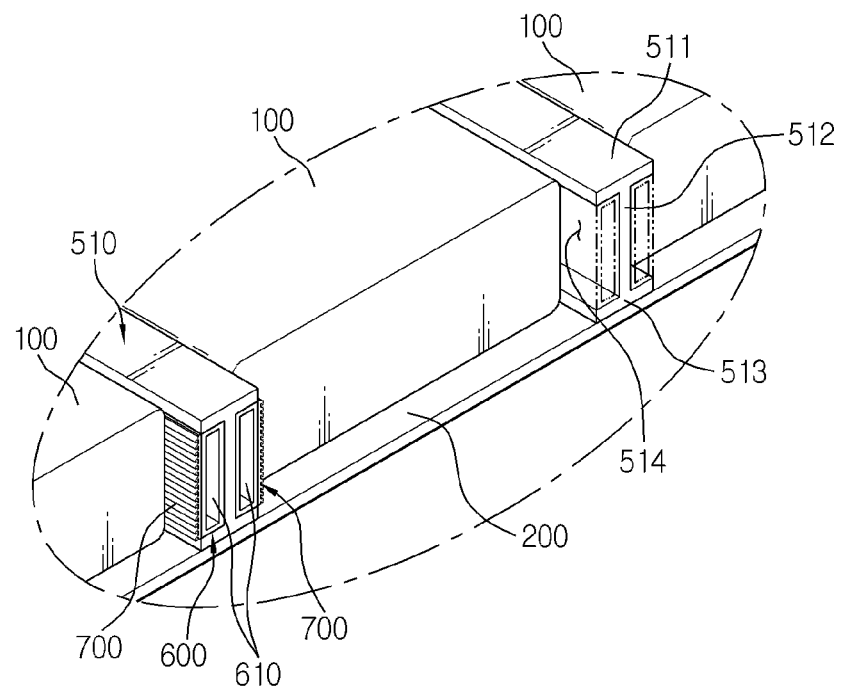
FIG. 4 is an enlarged view showing a portion A of FIG. 3.

FIG. 1 is a schematic perspective view showing a battery pack according to an embodiment of the present disclosure, FIG. 2 is an exploded perspective view of FIG. 1, FIG. 3 is a perspective view showing a tray at which a plurality of battery modules of FIG. 2 are loaded, and FIG. 4 is an enlarged view showing a portion A of FIG. 3.

Referring to FIGS. 1 to 4, the battery pack 10 according to an embodiment of the present disclosure includes a plurality of battery modules 100, and a pack case accommodating the battery modules 100. The pack case may include a tray 200 giving a space where the plurality of battery modules 100 are placed, a pack cover 300 for packaging and accommodating the plurality of battery modules 100 together with the tray 200, and two side frames 400.

A plurality of battery cells are stacked in the battery module 100, and the battery module 100 may further include various other components. For example, the battery cell may be a pouch-type secondary battery, and a plurality of battery cells may be provided and electrically connected to each other.

Though not shown in the figures, each battery cell may include various components such as an electrode assembly, a battery case accommodating the electrode assembly, and an electrode lead protruding out of the battery case and electrically connected to the electrode assembly. The electrode lead may include a positive electrode lead and a negative electrode lead. Here, the positive electrode lead may be connected to a positive electrode plate of the electrode assembly, and the negative electrode lead may be connected to a negative electrode plate of the electrode assembly.

The battery module 100 may further include stacking frames and a module end plate for stacking and protecting the pouch-type secondary battery.

The stacking frames are used for stacking secondary batteries and hold the secondary batteries not to be moved. The stacking frames are provided to be stacked one another to serve as a guide for assembling the secondary batteries. For reference, the stacking frames may be replaced by various other terms such as cell covers or cartridges.

The module end plate is an element for protecting and fixing the battery cell stack and may mean an angled structure surrounding the outer periphery of the battery cell stack or a plate-like structure padded on at least one surface of the battery cell stack. The module end plate is preferably made of a metal material with high mechanical rigidity and excellent thermal conductivity.

Though not shown in detail, the battery module 100 may further include cooling pins interposed between the battery cells. The cooling fins are thin members with thermally conductive, such as aluminum, and have ends extending outward to connect to other heat absorbing media, such as a heatsink 600, to transfer the heat of the battery cells to the outside.

As described above, the battery module 100 may refer to a collection of a plurality of battery cells or a collection of a plurality of battery cells and other components for stacking and protecting the plurality of battery cells. In addition, the battery pack 10 of the present disclosure may refer to a collection including a plurality of unit battery modules 100.

Specifically, referring to FIGS. 2 and 3, the battery pack 10 according to this embodiment is formed using ten unit battery modules 100 in total. The unit battery modules 100 may be loaded on the upper surface of the tray 200 in a 2×5 matrix form and be packaged by the pack cover 300 and two side frames 400.

The tray 200 and the pack cover 300 may be formed in a plate shape having an approximately large area and may be disposed at the lower and upper portions of the battery modules 100, respectively, to cover the lower and upper portions of the battery modules 100. In addition the two side frames 400 may be located at both side surfaces of the tray 200 to cover both side surfaces of the battery modules 100.

In particular, two side frames 400 of this embodiment may be provided in the form of a manifold tube. In more detail, seeing FIG. 2, the two side frames 400 have a passageway formed therein to serve as a pipe and have an inlet 410 or an outlet 420 formed at the outer portion thereof and a plurality of connectors 430 respectively connectable to input ports 610 and output ports (located at a side opposite to the input ports) of the heatsinks 600, explained later. The two side frames 400 serve to distribute the coolant to the heatsinks 600 or to collect the coolant from the heatsinks 600. That is, the two side frames 400 may be regarded as components of the pack case and form supply and discharge paths of the coolant into or out of the battery pack 10.

The pack case, namely the tray 200, the pack cover 300 and the two side frames 400, may give mechanical support for the battery modules 100 and protect the battery modules 100 from external impacts. Thus, the tray 200, the pack cover 300, and the two side frames 400 of the pack case may be made of metal material such as steel to ensure rigidity.

Referring to FIGS. 3 and 4, the battery pack according to the present disclosure further a plurality of I-type beam frames 510, a center frame 520 crossing the plurality of I-type beam frames 510, and a heatsink 600 mounted to the I-type beam frame 510.

The plurality of I-type beam frames 510 and the center frame 520 partition the upper surface of the tray 200 so that individual accommodation spaces capable of accommodating the battery modules 100 individually are formed in the tray 200.

As shown in FIG. 3, six I-type beam frames 510 may be arranged at the same interval along the vertical direction (the X-axis direction) of the tray 200, and one center frame 520 may be arranged to cross the six I-type beam frames 510 and traverse the center of the tray 200. The interval between two I-type beam frames 510 corresponds to the width of the unit battery module 100, and the height of the I-type beam frame 510 may be equal to or higher than the height of the battery module 100. Thus, accommodation spaces for ten unit battery modules 100 may be formed at the upper surface of the tray 200.

Each unit battery module 100 may be placed in the accommodation space so that the module electrode terminals 110 thereof face the center frame 520. At this time, both side surfaces of the unit battery module 100 may be supported two I-type beam frames 510 so that the unit battery module 100 is not moved.

Though not shown in detail for convenience, the center frame 520 may have an angled tube form and may have a plurality of holes formed in the outer surface thereof along the length direction (the X-axis direction). In addition, a connecting module (not shown) may be provided inside the center frame 520.

Two unit battery modules 100 are provided in each row, and the module electrode terminals 110 thereof may be inserted into the holes of the center frame 520 to face each other and are connected to the connecting module.

The connecting module may be composed of bus bars made of electrically conductive material and forming a serial and/or parallel network. The connecting module may connect the plurality of battery modules 100 in series or in parallel, or both in series and in parallel. In addition, the connecting module may be connected to a terminal of the battery pack 10 located at an outer side of the front surface of the tray 200, and the terminal 11 may be electrically connected to another device outside the battery pack 10.

According to the 2×N matrix arrangement of the battery modules 100 and the configuration of the I-type beam frames 510 and the center frame 520, it is possible to easily fix and load the battery modules 100, and it is possible to enhance the mechanical stiffness of the tray 200. In addition, it is possible to simplify the wiring structure without exposing a high-voltage cable or the like on the tray 200. Accordingly, the safety and space utilization of the battery pack 10 may be improved.

Referring to FIG. 4, the I-type beam frame 510 according to the present disclosure includes a top portion 511 and a bottom portion 513, which are horizontal with respect to the upper surface of the tray 200, and a column 512, which vertically connects the centers of the top portion 511 and the bottom portion 513 to form the height of the I-type beam frame 510. For reference, as an alternative of the I-type beam frame 510 of the present disclosure, a T-type beam frame may also be used. The T-type beam frame may be configured so that the bottom portion 513 is excluded and the column 512 is directly coupled to the tray 200. The I-type beam frame 510 and the T-type beam frame may be regarded as equivalent components since they serve as a component forming a recessed portion 514 as described below.

The space of the I-type beam frame 510 between the top portion 511 and the bottom portion 513 is divided into two parts by the column 512. Hereinafter, both the divided spaces, namely the spaces formed at both sides of the column 512, will be defined as recessed portions 514. The heatsink 600 is mounted in the recessed portion 514 of the I-type beam frame 510. Here, the heatsink 600 may refer to an object that absorbs and emits heat from other objects by thermal contact.

More specifically, the heatsink 600 according to the present disclosure is manufactured to have a shape corresponding to the recessed portion 514 of the I-type beam frame 510, and the input port 610 and the output port through which the coolant flows in and out are positioned at one end and the other end thereof. Also, the heatsink 600 has a hollow structure including a flow path therein. Each heatsink 600 may extend through the center frame 520 from one side of the tray 200 to the other side thereof along each I-type beam frame 510.

The coolant flowing in the flow path of the heatsink 600 is not particularly limited as long as it easily flows in the flow path and has excellent cooling ability, but for example, it may be gas or water, and preferably water that is capable of maximizing cooling efficiency due to high latent heat. However, without being limited to the above, the coolant may be an antifreeze, a gas coolant, an air or the like, which generates a flow.

The heatsink 600 may be integrated with the I-type beam frame 510. For example, the heatsink 600 and the I-type beam frame 510 are simply integrated by applying a thermally conductive adhesive to the inner surface of the I-type beam frame 510 and then inserting and adhering the heatsink 600 to the recessed portion 514 of the I-type beam frame 510. In this case, the space utilization of the tray 200 may be increased compared to the case where the heatsink 600 is provided at a separate position.

Figure 5:
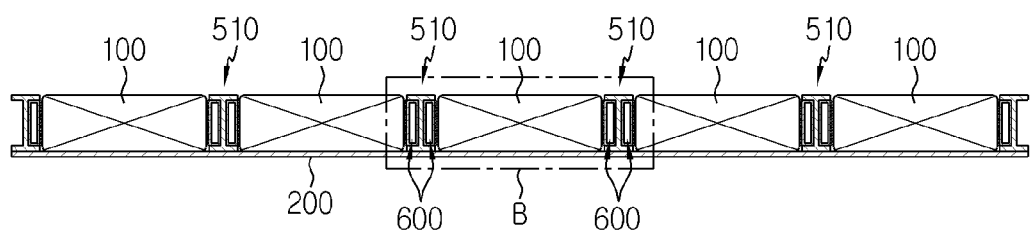
FIG. 5 is a cross-sectioned view, taken along the line I-I' of FIG. 3.
Figure 6:
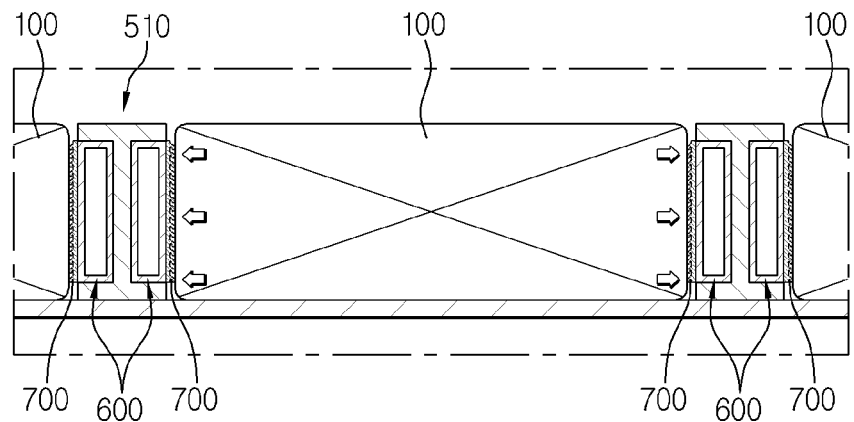
FIG. 6 is an enlarged view showing a portion B of FIG. 5.

That is, as shown in FIGS. 5 and 6, in the battery pack 10 of the present disclosure, one I-type beam frame 510 and two heatsink 600 may be combined with the corresponding shapes so that the space between the I-type beam frames 510 may be entirely utilized as a space for individually mounting the unit battery module 100, and the heat generated from each battery module 100 may be dissipated to both side surfaces of the battery module 100. In addition, since the I-type beam frame 510 may also be cooled by the heatsink 600, it is possible to prevent the I-type beam frame from being deformed due to the temperature rise, thereby more effectively controlling the heat of the entire battery pack structure.

Figure 7:
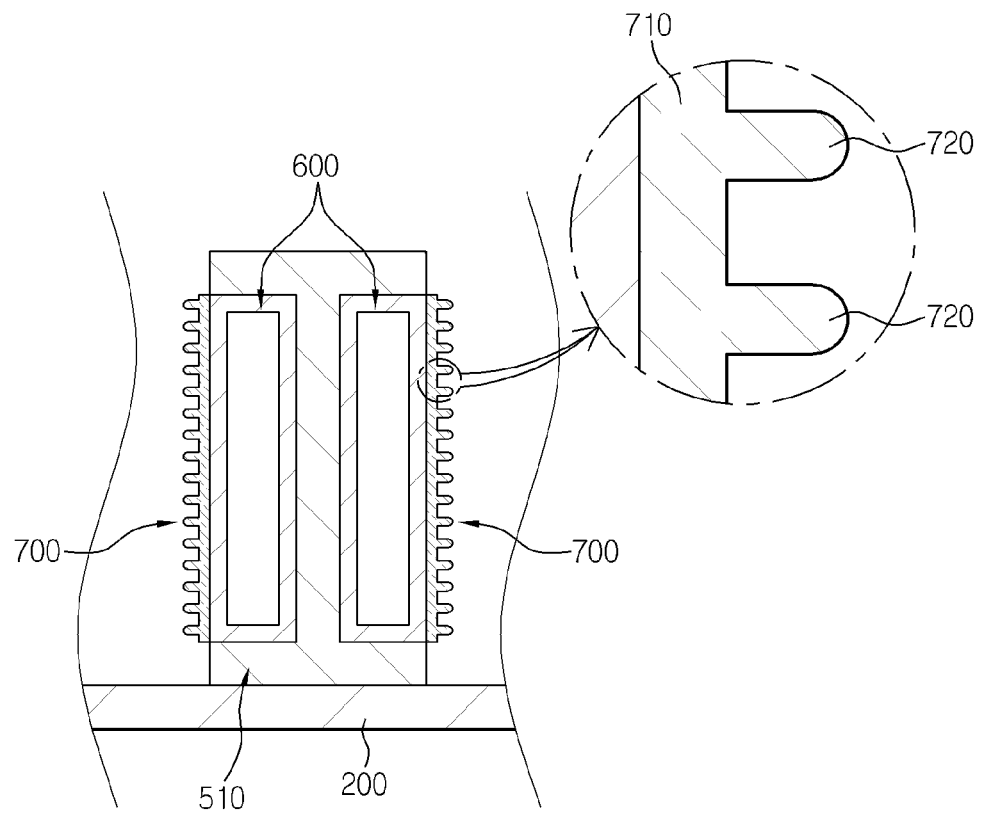

In addition, referring to FIGS. 6 to 8 mainly, in the battery pack 10 according to the present disclosure, a heat conduction medium 700 may be further interposed at a thermal interface of the heatsink 600 and the battery module 100. The heat conduction medium 700 may not be particularly limited in its thickness and structure as long as it is a thin member having thermal conductivity and is capable of filling the gap between the battery module 100 and the heatsink 600. For example, a sheet-shaped plate made of a metal material may be used. The metal material may be aluminum or aluminum alloy having high thermal conductivity and light weight among metals, but is not limited thereto. For example, copper, gold and silver may be used. In addition to the metal, ceramic materials such as aluminum nitride and silicon carbide are also possible.

In particular, the heat conduction medium 700 according to an embodiment of the present disclosure may include a plate surface 710 attached to one surface of the heatsink 600 and a protrusion 720 protruding perpendicularly with respect to the plate surface 710. The protrusion 720 may be made of, for example, silicone rubber that is elastically deformed when an external pressure is applied thereto. The silicone rubber has excellent thermal conductivity and heat dissipation properties and also allows elastic deformation.

As an alternative of the silicon rubber, a carbon flake or filler rubbers filled with a solution in which a highly conductive metal flake is mixed may also be applied.

In the heat conduction medium 700, when the unit battery module 100 is placed in a lower direction in the accommodation space between the I-type beam frames 510, the protrusion 720 is pressed by the side surface of the battery module 100 and thus bent downwards as shown in FIG. 8. At this time, since the protrusion 720 has an elastic restoring force to return to its original shape, the heat conduction medium 700 may strongly contact the side surface of the battery module 100. Accordingly, if the unit battery module 100 is inserted into the accommodation space, the left and right side surfaces of the battery module 100 are respectively kept in close contact with the heat conduction medium 700 as described above, so that the heat is easily transferred from the battery module 100 to the heatsink 600.

In addition, the heat conduction medium 700 may serve to hold the battery module 100. In other words, since the protrusions 720 of two heat conduction medium 700 serve to hold the battery module 100 at both side surfaces of the battery module 100, even though an external shock is applied to the battery pack 10, it is prevented that the battery module 100 is moved, and thus it is also possible to prevent a gap from being created between the battery module 100 and the heatsink 600.

As described above, according to the present disclosure, the stiffness and volume ratio of the battery pack 10 may be increased, and the cooling configuration for the individual battery module 100 may be compactly implemented. In addition, the contacting force of the individual battery module 100 to the heatsink 600 may be enhanced by using the heat conduction medium 700 having a protrusion shape and capable of elastic deformation. Accordingly, the cooling efficiency may be improved, and the individual battery modules 100 may be stably supported even though an external shock or vibration is applied thereto.

Meanwhile, the battery pack according to an embodiment of the present disclosure may further include various devices (not shown) such as a battery management system (BMS), a current sensor, a fuse and the like, for controlling charge and discharge of the battery modules.

The vehicle according to the present disclosure may include the battery pack according to the present disclosure. The battery pack may be applied not only to vehicles such as electric vehicles and hybrid electric vehicles but also to IT product groups.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may also be expressed differently based on a location of an observer or a shape in which an object is placed.

What is claimed is:

1. A battery pack, comprising:
   a plurality of battery modules;
   a tray including an interior space where the plurality of battery modules are positioned;
   a plurality of I-type beam frames traversing an upper surface of the tray to partition spaces where the plurality of battery modules are positioned, each I-type beam having a column that forms a height of the I-type beam frames with a first surface and a second surface opposite the first surface, a top piece and a bottom piece; and
   a plurality of heatsinks disposed between the battery modules and the I-type beam frames and mounted to recessed portions formed at the first surface and the second surface of the column,
   wherein the plurality of heatsinks includes a first heat sink contacting the first surface of the column of a first I-type beam frame and a second heat sink contacting the second surface of the column of the first I-type beam frame, the column extending between the first heat sink and second heat sink to prevent the first heat sink and second heat sink from contacting one another.

2. The battery pack according to claim 1, wherein the plurality of heatsinks are manufactured to have a shape corresponding to the recessed portions and are adhered to the recessed portions by a thermal conductive adhesive integrated with the respective I-type beam frame.

3. The battery pack according to claim 1, wherein the height of each I-type beam frame is equal to or greater than a height of the respective battery module.

4. The battery pack according to claim 1, further comprising:
a heat conduction medium interposed at a thermal interface between each heatsink and the respective battery module.

5. The battery pack according to claim 4, wherein each heat conduction medium has a plate surface attached to one surface of the heatsink and a protrusion vertically protruding from the plate surface, and the protrusion is configured to elastically deform when an external pressure is applied to the protrusion.

6. The battery pack according to claim 5, wherein each heat conduction medium is made of a silicon rubber.

7. The battery pack according to claim 1, further comprising a center frame extending in one direction, crossing the plurality of I-type beam frames and traversing a center of the tray, and
wherein the plurality of battery modules are arranged in a 2×N matrix.

8. A battery pack, comprising:
a plurality of battery modules;
a tray including an interior space where the plurality of battery modules are positioned;
a plurality of I-type beam frames traversing an upper surface of the tray to partition spaces where the plurality of battery modules are positioned;
a plurality of heatsinks disposed between the battery modules and the I-type beam frames and mounted to recessed portions formed at both side of a column that forms a height of the I-type beam frames to absorb heat from the battery modules;
a center frame extending in one direction, crossing the plurality of I-type beam frames and traversing a center of the tray,
wherein the plurality of battery modules are arranged in a 2×N matrix, and
wherein each of the heatsinks has a hollow structure with an input port and an output port respectively provided a first end a second end of the heat sink so that a coolant flows in or out therethrough, and
wherein each hollow structure traverses the upper surface of the tray along the respective I-type beam frame.

9. The battery pack according to claim 8, further comprising:
a pack cover covering the upper surface of the tray and two side frames covering both side surfaces of the tray, respectively,
wherein the two side frames are provided in the form of a manifold tube communicating with the input ports and the output ports of the heatsinks to form a path for supplying and discharging the coolant.

10. The battery pack according to claim 7, wherein the center frame has an angled tube form with a plurality of holes formed at an outer side surface thereof so that module electrode terminals of the plurality of battery modules are inserted therein, and a connecting module is provided in the center frame to connect the plurality of battery modules in series or in parallel, or both in series and in parallel.

11. An electric vehicle, comprising the battery pack defined in claim 1.

12. The battery pack according to claim 1, wherein the plurality of heatsinks comprises a first heatsink extending an entire length of one of the plurality of I-type beam frames.

13. The battery pack according to claim 1, wherein a width of each of the plurality of heat sinks is equal to a width of the recessed portion.

14. The battery pack according to claim 13, further comprising fins extending outwardly from each of the plurality of heat sinks,
wherein the fins contact a respective one of the plurality of battery modules.

15. The battery pack according to claim 1, wherein a surface of each of the first heat sink and second heat sink is coextensively in contact with one of the first surface and the second surface of the column.

16. The battery pack according to claim 1, wherein each of the plurality of heat sinks is hollow.

17. The battery pack according to claim 16, further comprising a hollow side frame in fluid communication with each of the plurality of heat sinks.

* * * * *